April 13, 1965         J. G. WRIGHT ET AL         3,178,682
AIRCRAFT GROUND POSITION INDICATOR
Filed Feb. 14, 1961                     5 Sheets-Sheet 1
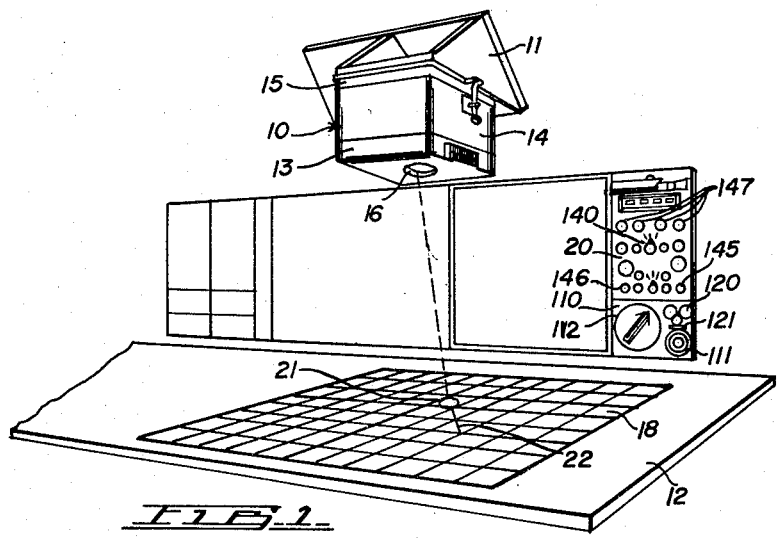
FIG. 1
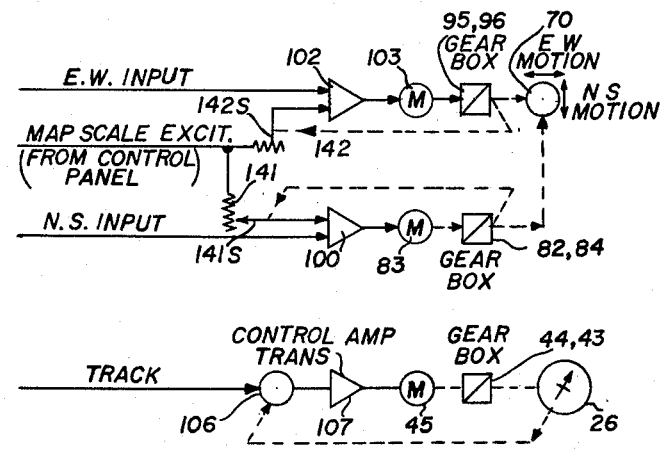
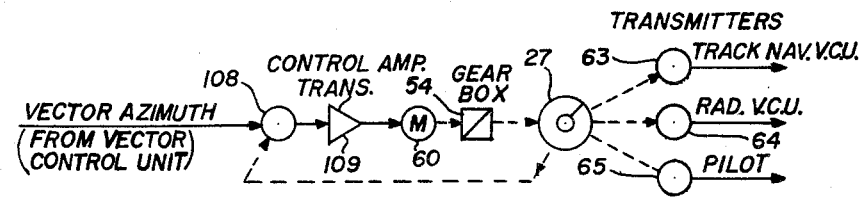
FIG. 2
INVENTORS
JERAULD G. WRIGHT
HUGH W. WILSON
BY— *Smart & Biggar*
ATTORNEYS.

INVENTORS
JERAULD G. WRIGHT
HUGH W. WILSON
BY- Smart + Biggar
ATTORNEYS.

April 13, 1965    J. G. WRIGHT ET AL    3,178,682
AIRCRAFT GROUND POSITION INDICATOR
Filed Feb. 14, 1961    5 Sheets-Sheet 3
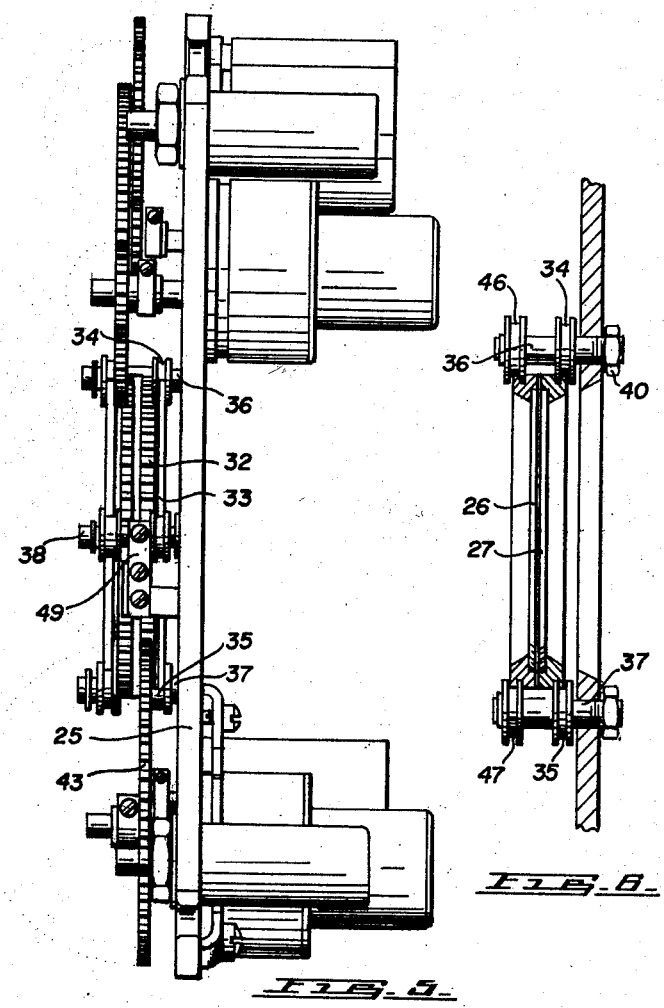
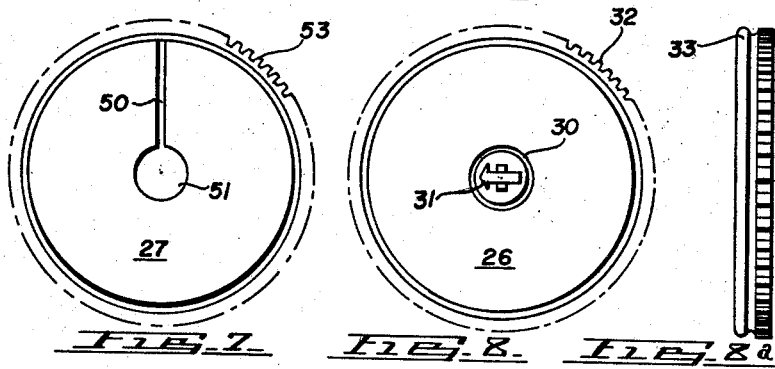
INVENTORS
JERAULD G. WRIGHT
HUGH W. WILSON
BY- *Smart + Biggar*
ATTORNEYS.

INVENTORS
JERAULD G. WRIGHT
HUGH W. WILSON
BY- *Smart + Biggar*
ATTORNEYS

April 13, 1965   J. G. WRIGHT ET AL   3,178,682
AIRCRAFT GROUND POSITION INDICATOR
Filed Feb. 14, 1961   5 Sheets-Sheet 5

INVENTORS
JERAULD G. WRIGHT
HUGH W. WILSON
BY— *Smart + Biggar*
ATTORNEYS.

United States Patent Office 3,178,682
Patented Apr. 13, 1965

3,178,682
AIRCRAFT GROUND POSITION INDICATOR
Jerauld George Wright, Dartmouth, Nova Scotia, and Hugh W. Wilson, Osgoode, Ontario, Canada, assignors, by direct and mesne assignments, to Her Majesty the Queen in right of Canada as represented by the Minister of National Defence, Ottawa, Ontario, Canada
Filed Feb. 14, 1961, Ser. No. 89,149
Claims priority, application Canada, Feb. 15, 1960, 792,518, Patent 646,103
4 Claims. (Cl. 340—23)

This invention relates to aircraft ground position indicators and more particularly to projectors therefor.

In aircraft anti-submarine operations ground position indicators are essential since an instantaneous display of the aircraft's position with respect to a chart is mandatory there being no time to transfer a position from a normal latitude and longitude indicating ground position indicator to the chart. This will be appreciated when it is considered that in the course of hunting and tracking down a submarine, the aircraft is under conditions of full manoeuvre for most of the time and ordinary navigation techniques are useless because the aircraft does not fly a straight line long enough for the navigator to plot it and keep track of it. Furthermore the navigator may be required to instantly home to some position indicated to him only on the map and under these conditions there is not even enough time for the navigator to transfer the aircraft's position from the latitude and longitude counters to the chart and calculate a course to the indicated target position.

Known ground position indicator projectors suffer from several drawbacks. Firstly they are subject to large distortions over the field of projection, these errors becoming largest at the corners of the field of projection, and secondly they are limited in their choice of scales.

Another drawback of the prior devices becomes apparent when it is considered that it is often desired to direct the aircraft from its present position to a target indicated on a chart. In the prior devices it was necessary for the navigator to measure the bearing from the aircraft to the target very rapidly with a protractor at the same time correcting the protracting angle for wind effect and pass the necessary course to steer verbally to the pilot of the aircraft. This becomes a very difficult operation because it must be remembered that the bearing will be changing very rapidly when the aircraft is close to the target.

It is an object of the present invention to provide a projector unit for a ground position indicator which will remove or reduce the drawbacks of the prior devices.

According to the present invention there is provided in a ground position indicator for an aircraft, a projector comprising a point source of light; a light transmitting graticule beneath said point source of light, which graticule is provided with a representation of the aircraft, means responsive to an input analogue of aircraft track to orient said graticule and representation thereon, and means for moving said point source of light relative to said graticule in a plane parallel thereto in response to input analogue signals of the coordinates of change in aircraft ground position, whereby a pictorial representation of aircraft position and the track being flown by the aircraft may be projected on a chart.

According to a feature of the invention a second graticule is located immediately beneath and co-axial with the first mentioned graticule and is adapted to transmit therethrough the image of the aircraft representation from the first graticule and to provide on the chart a line of light radiating outwardly from the aircraft representation, means being provided to respond to a command azimuth analogue signal to orient said second graticule whereby to provide on a chart, in addition to the pictorial representation of the aircraft's position, the vector bearing from the aircraft to a selected object.

According to a further feature of the invention means are provided for alterning the scale of values of the input analogue signals of the coordinates of change in aircraft ground position whereby to alter the scale of the pictorial representation of ground position.

The following is a description by way of example of one embodiment of the present invention, reference being had to the accompanying drawings in which—

FIGURE 1 is a pictorial representation of the projector in accordance with this invention mounted above a chart table for projection thereon of the representation of the aircraft and of a pictorial representation of a command azimuth vector;

FIGURE 2 is a diagrammatic representation of the information flow in the device in accordance with the invention;

FIGURE 5 is an end view of the lower section illustrated in FIGURE 3;

FIGURE 6 is an enlarged detail of the lower section illustrated in FIGURE 5, viewed in the same direction;

FIGURE 7 is a detail of one of the graticules;

FIGURE 8 and 8A are plan and side views respectively of the second graticule;

Figure 3:
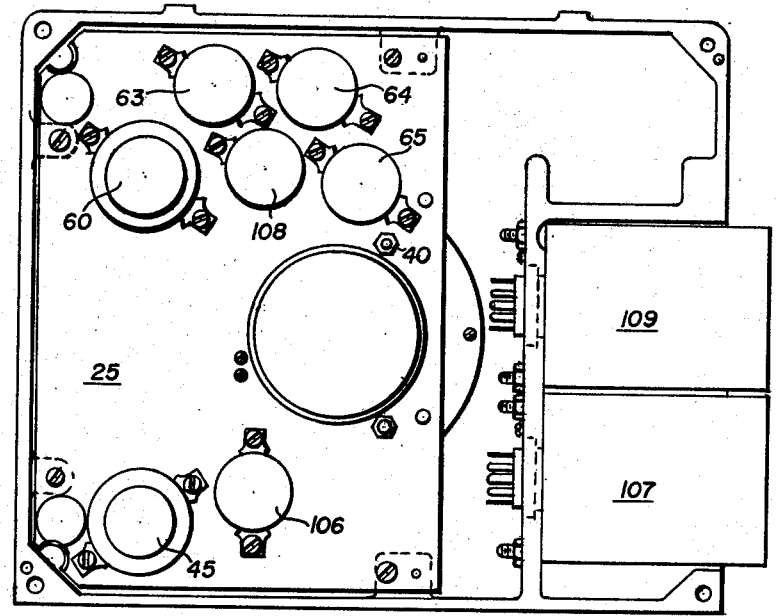
FIGURE 3 is the plan view of the inside of the lower section of the projector.

Referring now to the drawings:

The numeral 10 generally indicates a projector unit mounted on a bracket 11 to the aircraft at a navigator's position above a chart table 12. The projector 10 comprises a lower section 13, an upper section 14 and a cover 15. The lower section 13 is provided with an aperture 16 through which a beam of light may be projected on to the chart 18 from a point source of light movably mounted in the upper section 14. A control panel 20 is located behind the chart table 12, on which control panel is provided the necessary switches for scale selection and operation of the projector. The projector, when in operation, projects a representation of the aircraft 21 and a command vector beam 22 in the form of a line of light radiating outwardly from the aircraft representation. As will be seen from the following, the aircraft representation 21 moves across the chart 18 in accordance with the aircraft's flight path and the command vector beam 22 may be rotated a complete circle with the representation 21 as the centre of rotation.

Within the lower section 13 of the projector 10 there is provided a plate 25 on which are mounted a pair of graticules 26, 27, one above the other and the necessary equipment to rotate them.

The graticule 26 is generally transparent but is adapted to block inner:outer circumferences of light from the point source thereabout the circle 30 and aircraft representation 31 to provide the projected image 21 of the aircraft representation on the chart.

The graticule 26 is provided on its periphery 32 with gear teeth and with a lip 33 spaced therefrom by which the graticule is mounted for rotation in three grooved rollers, two of which, 34, 35, are seen in FIGURES 5 and 6. These rollers are mounted on three pins, 36, 37 and 38, are held in place by nuts similar to the nut 40. Mating with the geared periphery 32 of the graticule is a control transformer gear 43 which in its turn mates with gear 44 of the track motor 45.

The pins 36, 37 and 38 extend beyond the plate 25 and are provided near their extremities with a second set of rollers 46, 47, 48. The rollers on the pin 38 are spring loaded by a leaf spring 49 to position the graticule 26 and a second graticule 27 in the grooved rollers.

Figure 4:
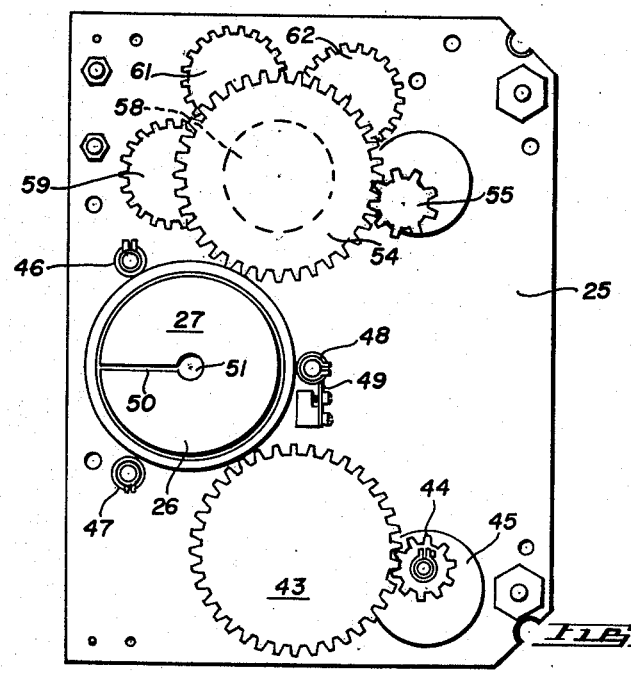
FIGURE 4 is a view of a detail of the lower section illustrated in FIGURE 3 looking from the underside thereof.

The second graticule 27 is circular in shape and is provided with a slot 50 and central aperture 51. The graticule 27 is provided with a lip similar to the lip 33 for engagement with the rollers, its periphery being provided with gear teeth 53 which mesh with control transformer gear 54 which in its turn meshes with a gear 55 of a command azimuth servo motor. The slotted and apertured configuration of the graticule 27 permits the transmission of the image of the representation 31 and the circle 30 through the aperture 51 and a line or beam of light through slot 50 to produce the vector 22 on the chart 18. The gear 54 is compounded with a second gear wheel 58 (FIGURE 4) of which wheel meshes with gears 59, 61 and 62 of azimuth transmitters 63, 64, 65.

Figure 9:
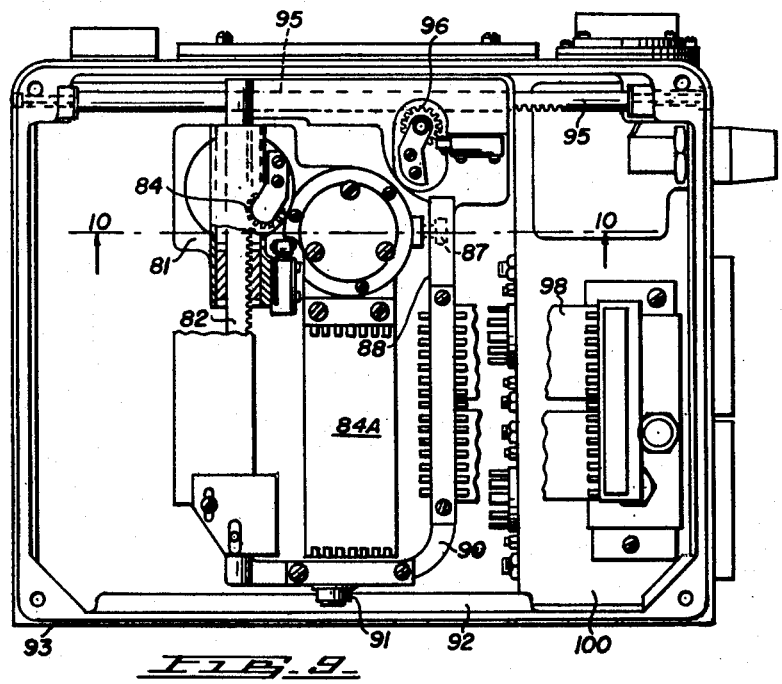
FIGURE 9 is a plan view of the upper section of the projector partially in section and with the top cover removed.
Figure 10:
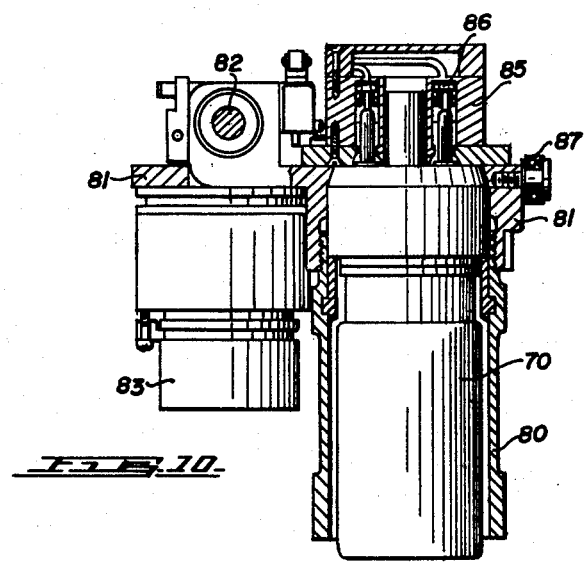
FIGURE 10 is a sectional elevation on the line 10—10 of FIGURE 9.

In the upper section 14 of the projector there is provided a point source of light 70 (FIGURES 9 and 10) mounted in a casing 80 which is screw-threaded to a housing or carriage 81. The housing 81 is mounted for movement on the rack 82 and is driven therealong by means of a motor 83 which drives a pinion wheel 84 on the housing 81. The pinion 84 is not shown in FIGURE 10 for the sake of clarity. A roller 87 is attached to the housing 81 and runs in a channel-like guideway 88 and supports the other side of the housing. Electrical transmission to the lamp is provided from a source of power on a flexible printed circuit 84A. A limit switch 81a is provided to prevent the carriage 90 from overrunning and being damaged. A cap 85 with the necessary electrical connections 86 is provided above the lamp 70. The rack 82 is mounted on the frame of a second carriage 90 which includes the guideway 88 and is provided at one end with a roller 91 adapted to roll along a guideway 92 on the outer case 93 of the upper section 14. On the side remote from the roller 91 the carriage 90 is provided with a bore to pass a rack 95. On the carriage 90 a motor driven pinion 96 is provided which meshes with the rack 95 and moves the carriage 90 backwards and forwards along the rack 95 and guideway 92 at the same time carrying therewith the housing 81 and lamp 70.

It will be observed that the lamp thus has universal movement within the upper section 14 of the projector since it can move transversely of the upper section 14 on the rack 82 and longitudinally of the upper section 14 with the carriage 90 on the rack 95.

A printed circuit 98 conducts power from a source of supply to the carriage 90 to drive the motors for the pinions 96 and 84.

In operation a Cartesian coordinate of change of aircraft ground position in the form of an electrical analogue signal is obtained from some suitable ground position computer, for example, the computer described in the Wright et al. copending application Serial No. 89,148 filed February 14, 1961, now Patent No. 3,080,117, and is applied to the amplifier 100 (FIGURE 2) to drive the motor 83 and thus the pinion gear 84 and housing 81 along the rack 82 until the incoming signal to the amplifier 100 is balanced by the slider 141s on the potentiometer 141. This action imparts a transverse motion to the lamp 70. The potentiometer 141 may be mounted longitudinally of the rack 82 and the wiper 141s therefore may be mounted on the carriage 81. It will be seen therefore that the incoming signal to the amplifier 100 will not be balanced until the lamp 70 has taken up a position in accordance with the incoming signal.

An analogue signal of a Cartesian coordinate of change of aircraft ground position at right angles to the Cartesian coordinates applied in analogue form to the amplifier 100 is obtained from the same ground position computer as before and applied in electrical analogue form to the amplifier 102 and thence to motor 103 to impart a longitudinal motion to the lamp 70. That is to say, an input analogue of the last mentioned Cartesian coordinate causes the motor 103 to drive the pinion 95 along the rack 96 and thus move the carriage 90 with the housing 81 and lamp 70 therein longitudinally of the upper section of the projector 14. The longitudinal motion is continued until the slider 142s of the potentiometer 142 takes off a voltage which balances the applied analogue signal to the amplifier 102. The potentiometer 142 may be mounted on the casing 93 of the upper section 14 of the projector and the slider 142s may be mounted on the carriage 90.

The continuous input of analogue signals of Cartesian coordinates of aircraft position causes the representation 21 to move across the map 18 in accordance with the aircraft flight path. Thus the navigator by reference to the chart 18 may at any time determine the aircraft's instantaneous position.

The Cartesian coordinates applied in analogue form to amplifiers 100, 102 may be either ordinary grid coordinates but when the projector is used with a computer such as that described in application Serial No. 89,148, now Patent No. 3,080,117, provision is made whereby the inputs may alternatively, if desired, be Mercator coordinates, that is to say "east-west miles" and "north-south miles" coordinates. Since on a Mercator chart the latitude varies as a function of the secant of the longitude this function is taken into account in the computer and the input signal to the amplifier so corrected.

When it is desired to use different scales of map the excitation to potentiometers 141, 142 are selected to correspond with the scale being used for a small scale map the excitation will be selected such that the movement of the representation 21 is a very slow movement, and where large scale maps are used the movement will be relatively fast. A switch 140 is provided in the control panel 20, which selects one of a plurality of scales on which the projector is to operate, that is to say if the navigator desires to operate on a 1:1,000,000 scale map 18 he will push the appropriate scale select switch 147 on the control panel select the excitation for potentiometers 141, 142 so that the Cartesian coordinate input analogues are compared on the potentiometers at the required scale and the projected image of the lamp 21 of the aircraft representation will be moved across the chart at the correct speed for the chart being used. Similarly 1:500,000, 1:250,000 and 1:50,000 scales may be selected by the push button switches 147 and the potentiometers 141, 142 will carry the corresponding map scale excitation so that the image of the representation 21 will move on the chart at the required scale and speed. Sluing switches 145, 146 are provided on the panel. The provision of the sluing switches is to enable the navigator to correct his position on the chart when he obtains a reliable position fix and finds that the computed dead reckoned position is somewhat erroneous. The operation of the sluing switches 145, 146 is not detailed since the motors 83 and 103 are merely directly operated by the switches to arrange the required sluing of the lamp 70.

An electrical analogue of true track which the aircraft is making good is obtained from the same ground position computer and is applied to a control transformer 106 (FIGURE 2) and transmitted to an amplifier 107 where the signal is amplified and applied to the motor 45. The motor 45 then drives the graticule 26 through the gear train 44, 43 and the geared periphery 32 of the graticule to position the representation 31 of the aircraft so that the projected light beam on the chart 18 indicates the true track which the aircraft is making good. Also the motor 45 acts to position the control transformer 106 to balance the input signal thereto.

A command azimuth vector is set into the control transformer 108 as an electrical analogue signal which is amplified in the amplifier 109 and applied to the motor 60, which through the compound gear 54 drives the graticule 27 to project onto the chart 18 the command azimuth vector 22. The transmitters 63, 64 and 65 are connected to the compound gear through gears 61, 62 and 55 and thus transmit the vector analogue signal which has caused the graticule 27 to take up its position. Also the motor 60 acts to position the control transformer 108 to balance the input signal thereto.

Figure 11:
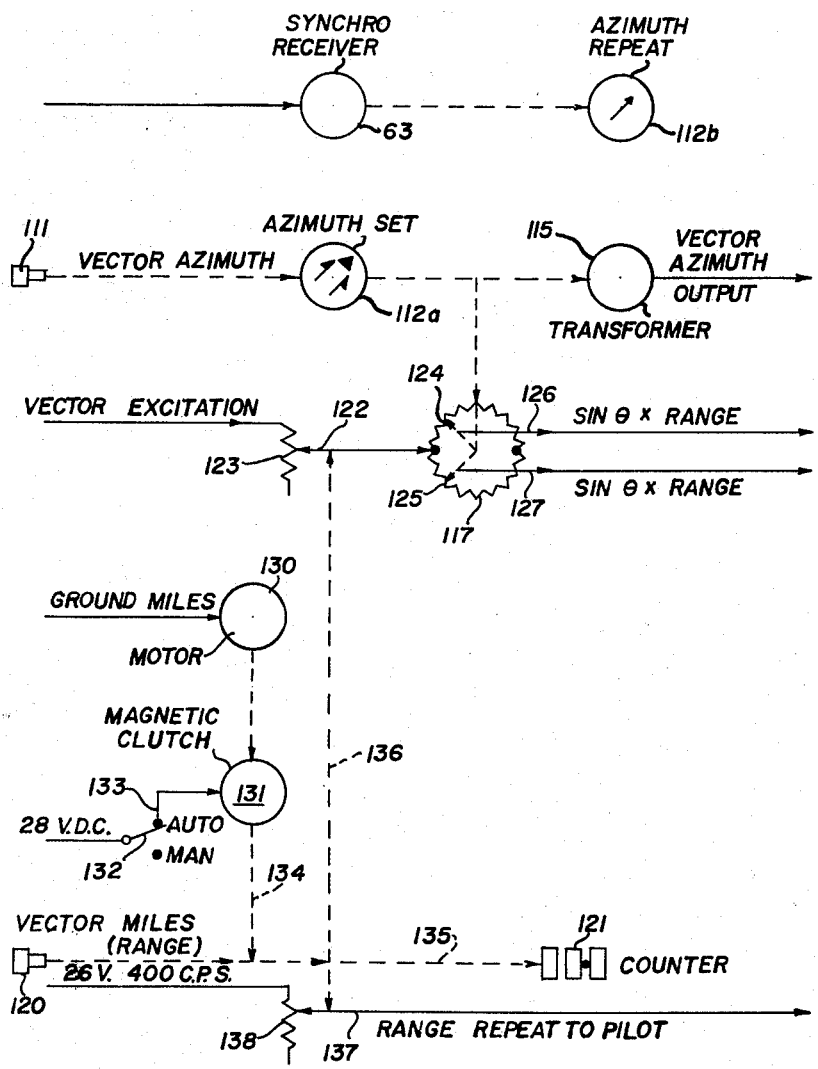
FIGURE 11 is a diagrammatic representation of a feature of the invention.

On the panel 20 there is provided a vector control unit 110 having a manually operated vector setting knob 111 for controlling the vector 22 on the chart 18, and a dial indicator 112. The dial indicator is provided with a compass card and two separately mounted pointers 112a and 112b (FIGURE 11). The vector setting knob 111 mechanically positions the pointer 112a on the dial indicator to a desired command azimuth setting and causes a control transformer 115 to electrically transmit the analogue of the command vector azimuth set in manually on the knob 111 to the synchro control transformer 108, thereby positioning graticule 27 and the vector 22 on the chart 18. The synchro receiver 63 is positioned by gears 58 and 63 and acts to orient the dial 112b to bring it into line with the setting shown on the azimuth dial 112a. A similar vector control unit is provided for the radar operator at a remote position in the aircraft and he can transmit on his instrument a vector azimuth analogue signal to control transformer 108 by setting a knob of his instrument similar to the knob 114. When the radar operator sets in the command azimuth vector, the repeater pointer 112b of the navigator's instrument follows the vector 22 (through the action of gears 58 and 61) and similarly the radar operator's repeater pointer follows the command vector when set in by the navigator through the action of gears 58, 62 and transmitter 64 to the radar operator's instrument.

Also on the front of the vector control unit is a range setting knob 120 by which the navigator may set in a distance to a target at the same time as calling up the bearing thereto by operating the knob 114. The analogue of the range input of the knob 120 is repeated on a counter 121 on the face of the unit. As well as applying the analogue of the range input to the counter 121 the knob 120 mechanically operates a wiper 122 of a potentiometer 123 to apply an electrical analogue input to the resolver 117. It will be noted that the vector setting knob 111 is also mechanically coupled to the resolver 117 and supplies it with the analogue of bearing to the target as a second input. Wipers 124 and 125 on the resolver 117 take off respectively the analogues of sine $\theta$ range and cos $\theta$ range; where $\theta$ is the angle of bearing to the target. These first and second resolutions are transmitted on electrical conductors 126, 127 through selector switches (not shown) to the remote computer which provides the inputs analogue of Cartesian coordinates to the lamp 70. This enables the radar operator or the navigator, on operation of the selector switches by the navigator, to move the projected representation 21 to a target position on the chart 18 to enable him to plot the target position on the chart 18, since the selector switches disconnect the normal input to motors 83 and 103 and instead select the inputs of sine $\theta$ range and cos $\theta$ range.

The vector control unit 110 is also capable of receiving an electrical analogue of ground miles travelled to a step by step motor 130 which is mechanically coupled to a magnetic clutch 131 whereby on actuation of a switch 132 to make contact 133 the motor 130 drives the range counter through mechanical connections diagrammatically illustrated as 134, 135, thus the navigator and radar operator have a visual read-down of the aircraft's approach to the selected target as the counter is driven down from the range set in to zero, provided that the aircraft is steered to make good the track indicated by the vector 22. Through mechanical connection 136 a wiper 137 of a potentiometer 138 is actauted to apply an electrical analogue of the read-down to a pilot's repeater whereby to give the pilot a visual indication of his approach to the selected target. Where the pilot's repeater is an instrument such as described in the Wright co-pending application Serial No. 89,148, filed February 14, 1961, now Patent No. 3,080,117 the synchro 65 can be used to transmit the command course to steer (that indicated by vector 22) provided that the pilot wishes to select this information.

To start or fire that lamp 70 any suitable lamp starting circuit may be used.

The term Cartesian coordinates used herein and in the claims is intended to include not only linear coordinates but also Mercator scales.

What we claim as our invention is:

1. In a ground position indicator for an aircraft, a projector comprising a point source of light; a light transmitting graticule bearing an aircraft representation beneath said point source of light; a second graticule beneath the first mentioned graticule adapted to transmit the image of the aircraft representation and an azimuth vector; means responsive to an input analogue of aircraft track to orient said aircraft representation bearing graticule; means responsive to a command azimuth analogue signal for orienting said second graticule; and means for moving said point source of light relative to said graticules in a plane parallel thereto in response to input analogue signals of the coordinates of change in aircraft ground position, whereby a pictorial representation of aircraft position, the track being flown by the aircraft, and the vector bearing from the aircraft of a selected object may be projected on a chart.

2. In a ground position indicator for an aircraft, a projector comprising a light transmitting graticule bearing an aircraft representation; means responsive to an input analogue of aircraft track to orient said graticule; a second graticule beneath said first mentioned graticule, which second graticule is adapted to transmit an image of the aircraft representation and an azimuth vector; means responsive to a command azimuth analogue signal for orienting said second graticule; a carriage mounted above said graticules for movement in a plane parallel thereto; a second carriage mounted on said first carriage for movement therewith and for movement thereon in said plane at right angles to the path of travel of the first carriage; a point source of light on said second carriage; means adapted to traverse said first carriage relative to said graticules in accordance with an input analogue signal of a Cartesian coordinate of change in aircraft ground position, means responsive to an analogue signal of a Cartesian coordinate of change in aircraft ground position at right angles to said first mentioned coordinate of change in aircraft ground position for driving said second carriage relative to said graticule and to said first mentioned carriage whereby a pictorial representation of aircraft position, the track being flown by the aircraft, and the vector bearing from the aircraft of a selected object may be projected on a chart.

3. A projector for use with a ground position indicator for an aircraft, which position indicator is capable of generating analogue signals of Cartesian coordinates of change in aircraft ground position at right angles to each other, said projector comprising: a point source of light; a light transmitting graticule beneath said point source of light, which graticule is provided with a representation of the aircraft and is positioned beneath said point source of light; a second graticule beneath the first mentioned graticule adapted to transmit the image to the aircraft representation and an azimuth vector; means responsive to an input analogue of aircraft track to orient said aircraft representation bearing graticule; means responsive to a command azimuth analogue signal for orienting said graticule; and means for moving said point source of light relative to said graticules in a plane parallel thereto in response to input analogue signals of the said Cartesian coordinates of change in aircraft ground position; control means comprising: resolving means; means for setting into said resolving means the analogue of bearing of the selected object to said aircraft, means for setting into said resolving means as a second input the analogue of the range of said selected object from said aircraft, said resolving means being adapted to resolve the analogues of the sine of said angle of bearing of said selected object to said aircraft multiplied by the range of said object from said aircraft and the analogue of the cosine of the angle of bearing of said selected object from said aircraft multiplied by the range of the object from said aircraft and to apply these last two mentioned analogues to the ground position indicator; and selector switch means adapted on operation to select these last two mentioned analogues as outputs from said ground position indicator thereby to apply them as Cartesian coordinate analogues to move said point source of light whereby a pictorial representation of the ground position of said selected object may be projected on the chart.

4. A ground position indicator as claimed in claim 3 in which said means for setting the analogue of range of the selected object into said resolving means is adapted also to operate a counter thereby giving a visual indication of the range of the selected object from the aircraft, and in which motor means is provided, driven in response to an input analogue signal of ground miles travelled from said ground position indicator, to drive said counter whereby a read-down of the aircraft approach to the object may be visually indicated on the counter.

References Cited by the Examiner
UNITED STATES PATENTS

| | | | |
|---|---|---|---|
| 2,528,142 | 10/50 | Herzlinger | 340—315 |
| 2,692,377 | 10/54 | Brettell | 340—24 |
| 2,771,593 | 11/56 | Straehl | 340—24 |
| 2,836,816 | 5/58 | Allison et al. | 343—112 |

NEIL C. READ, *Primary Examiner.*

IRVING L. SRAGOW, ROBERT H. ROSE, *Examiners.*